United States Patent
Jiang et al.

(10) Patent No.: US 11,354,721 B2
(45) Date of Patent: Jun. 7, 2022

(54) COMPUTERIZED SYSTEMS AND METHODS FOR PROVIDING PRODUCT RECOMMENDATIONS

(71) Applicant: Coupang Corp., Seoul (KR)

(72) Inventors: Rui Jiang, Burlingame, CA (US); Dongcheng Wang, Santa Clara, CA (US); Sungmin Oh, Sunnyvale, CA (US); Ting Wang, San Jose, CA (US); Jaedong Shin, Cupertino, CA (US)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/014,551

(22) Filed: Sep. 8, 2020

(65) Prior Publication Data
US 2021/0118036 A1 Apr. 22, 2021

Related U.S. Application Data

(60) Provisional application No. 62/916,168, filed on Oct. 16, 2019.

(51) Int. Cl.
*G06Q 30/00* (2012.01)
*G06Q 30/06* (2012.01)
(Continued)

(52) U.S. Cl.
CPC ... *G06Q 30/0631* (2013.01); *G06F 16/24578* (2019.01); *G06F 16/9535* (2019.01);
(Continued)

(58) Field of Classification Search
CPC ..... G06Q 30/0601–0645; G06Q 30/08; G06N 20/00; G06F 16/9535; G06F 16/24578; G06F 16/9538
(Continued)

(56) References Cited

U.S. PATENT DOCUMENTS 8,301,764 B2 10/2012 Konig et al.
8,751,472 B2 6/2014 Mei et al.
(Continued)

FOREIGN PATENT DOCUMENTS

CN 107909433 4/2018
CN 108960945 12/2018
(Continued)

OTHER PUBLICATIONS

Chen, L., Chen, G. & Wang, F. Recommender systems based on user reviews: the state of the art. User Model User-Adap Inter 25, 99-154 (2015). https://doi.org/10.1007/s11257-015-9155-5 (Year: 2015).*
(Continued)

*Primary Examiner* — Jeffrey A. Smith
*Assistant Examiner* — Kennedy Gibson-Wynn
(74) *Attorney, Agent, or Firm* — Finnegan, Henderson, Farabow, Garrett & Dunner, LLP

(57) ABSTRACT

Systems and methods are provided for providing product recommendations, comprising receiving, from a user device, a search query, defining, using a query handler cluster, context associated with the search query, identifying, using a search cluster, one or more products associated with the defined context, filtering, using the search cluster, the one or more products associated with the defined context based on features associated with the one or more products stored in a database, ranking, using the search cluster, the one or more products associated with the defined context based on a score generated for each product, and displaying, on the user device, product recommendations, wherein the product recommendations comprise a number of the one or more ranked products.

16 Claims, 11 Drawing Sheets

(51) Int. Cl.
*G06Q 30/02* (2012.01)
*G06N 20/00* (2019.01)
*G06F 16/2457* (2019.01)
*G06F 16/9538* (2019.01)
*G06F 16/9535* (2019.01)

(52) U.S. Cl.
CPC ......... *G06F 16/9538* (2019.01); *G06N 20/00* (2019.01); *G06Q 30/0282* (2013.01); *G06Q 30/0627* (2013.01); *G06Q 30/0641* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 9,582,534 B1 * | 2/2017 | Hoover | G06F 16/245 |
| 9,779,441 B1 * | 10/2017 | Jadhav | G06Q 30/0282 |
| 9,904,949 B1 | 2/2018 | Tavernier | |
| 10,185,748 B1 * | 1/2019 | Ayzenshtat | G06F 16/248 |
| 10,706,453 B1 * | 7/2020 | Morin | G06N 20/20 |
| 10,949,432 B1 * | 3/2021 | Grayson | G06F 16/9035 |
| 2005/0149496 A1 | 7/2005 | Mukherjee et al. | |
| 2015/0286708 A1 | 10/2015 | Tao | |
| 2019/0057154 A1 * | 2/2019 | Philip | G06F 16/3344 |
| 2019/0102397 A1 | 4/2019 | Hornkvist et al. | |
| 2019/0163805 A1 | 5/2019 | Agarwal et al. | |
| 2021/0073891 A1 * | 3/2021 | Al Jadda | G06Q 30/0643 |

FOREIGN PATENT DOCUMENTS

| | | |
|---|---|---|
| JP | 2016-091535 A | 5/2016 |
| KR | 10-2004-0039691 | 5/2004 |
| KR | 10-2019-0060632 | 6/2019 |
| TW | 201909001 | 3/2019 |
| TW | 201909001 A | 3/2019 |

OTHER PUBLICATIONS

Deng, Wei. "Hybrid and Dynamic Recommender Models for Consumer Decision Making and Marketing." Order No. 10247163 University of Nebraska at Omaha, 2016. Ann Arbor: ProQuest. Web. Feb. 10, 2022. (Year: 2016).*
Batmaz, Zeynep, et al. "A Review on Deep Learning for Recommender Systems: Challenges and Remedies." The Artificial Intelligence Review 52.1 (2019): 1-37. ProQuest. Web. Feb. 10, 2022. (Year: 2019).*
International Search Report in PCT/IB2020/058390, dated Dec. 17, 2020 (3 pages).
Written Opinion ofth e International Searching Authority in PCT/IB2020/058390, dated Dec. 17, 2020 (5 pages).
Australian Examination Report for Australian Application No. 2020264259, dated Dec. 18, 2020 (8 pag es).
Examination Report No. 2, dated Aug. 27, 2021, by the Australian Patent Office in counterpart Australian Patent Application No. 2020264259, 5 pages.
Examination Notice, dated Nov. 5, 2021, by the Hong Kong Patent Office in counterpart Hong Kong Patent Application No. 22020016819.7, 5 pages.
Office Action dated Mar. 30, 2021, by the Taiwanese Patent Office in Taiwanese Patent Application No. 109135602, 17 pages.
Notice of Preliminary Rejection issued by Korean Intellectual Property Office, corresponding with a Korean Application No. 10-2021-7017242, dated Nov. 29, 2021 (16 pages).
Office Action for Taiwanese Application No. 11120196990, dated Feb. 25, 2022.

* cited by examiner login  Sign Up  Service center

| Category | Cheese | ? | 🛒 |

My Orders  Shopping Cart all 'Cheese' (65,586)          Gift Cards filter

65,586 results for 'Cheese'
Related searches: <u>Sliced cheese  baby cheese  cheddar cheese</u>

☐ Fast Delivery
☐ Imported Product

<u>string cheese  butter  pizza cheese  cream cheese  cheese stick</u>
<u>cubed cheese  parmesan cheese</u>                          6 per page category
All
Food
Silverware
Kitchen utensils
Home electronics digital
Household goods
  View more brands
  Local Milk
  Daily dairy
  Cattle and trees
View more scope
All stars
  4 or more
  3 or more
  2 or more
  1 or more

FREE Shipping
Sliced cheese, 18g,
100 pieces
(88 won per 10 g)
Morning (Thursday)

(1294)

Mozzarella cheese,
1kg, 2 pieces
🚀
(103 won per 10 g)
Tomorrow (Wed)

(285)

100 grams of cheddar
sliced cheese,
18 grams, 100 pieces
(73 won per 10 g)
Morning (Thursday)

(862)

Grated Parmesan
Cheese, 85g, 1 piece
🚀
(389 won per 10g)
Tomorrow (Wed)

(839)

Mozzarella cheese,
1 kg, 1
(85 won per 10g)
Morning (Thursday)

(379)

FREE Shipping
1.36 kg of string
cheese
Morning (Thursday)

Favorites  Application                                                    login   Sign Up   Service center

[ all ]

My Account  Shopping Cart

Shipments  Fast Shipments  Christmas  Gold deals  Regular delivery  Events / Coupons  Planned Exhibition
Gift Cards Home > Food > Daily products / ice cream > Cheese > Fresh cheese > Mozzarella mozzarella cheese
285 Reviews    20,000 won

FREE Shipping
Tomorrow (Wed) 11/28 Arrival Guarantee
Weight per piece x Quantity : 1kg x 2 pieces

| 1 | Add to cart | Buy now |

- Country of origin: See product description
- Shelf Life: 2019-11-04
- Total quantity: 2
- Cheese form: crushed (powder)
- Item Number: 23532 - 3432551

Products purchased by other customers

| Rosé spaghetti sauce, 600g, 2... | Chunky Tomato Pasta... | Grated Parmesan cheese, | Bacon and Mushroom Cream Pasta Sauce | Chili sauce, 295ml, 1 | Hot sauce, |
| --- | --- | --- | --- | --- | --- |
| 6,500 won | 3,800 won | 6,460 won | 4,870 won | 2,370 won | 2,340 won |
| (54 won per 10g) | (86 won per 10g) | (285 won per 10g) | (108 won per 10g) | (80 won per 10ml) | (66 won per 10ml) |
| (3,721) | (545) | (1,330) | (3,193) | (2,552) | (245) |

Product Details     Reviews (285)     Contact Us     Shipping & Returns

Required notation information

| Type of food | Natural cheese / frozen products | Producers and Locations | Cheese Corp. / Republic of Korea |
| --- | --- | --- | --- |
| Date of manufacture, shelf life or quality maintenance | Shelf Life: Products manufactured on or after November 04, 2019 : Manufactured goods after May 19, 2018 | Capacity (weight), quantity by packing unit | 1kg, 2 pieces |
| Ingredients and Content reference | | nutrient | None |

FIG. 1C

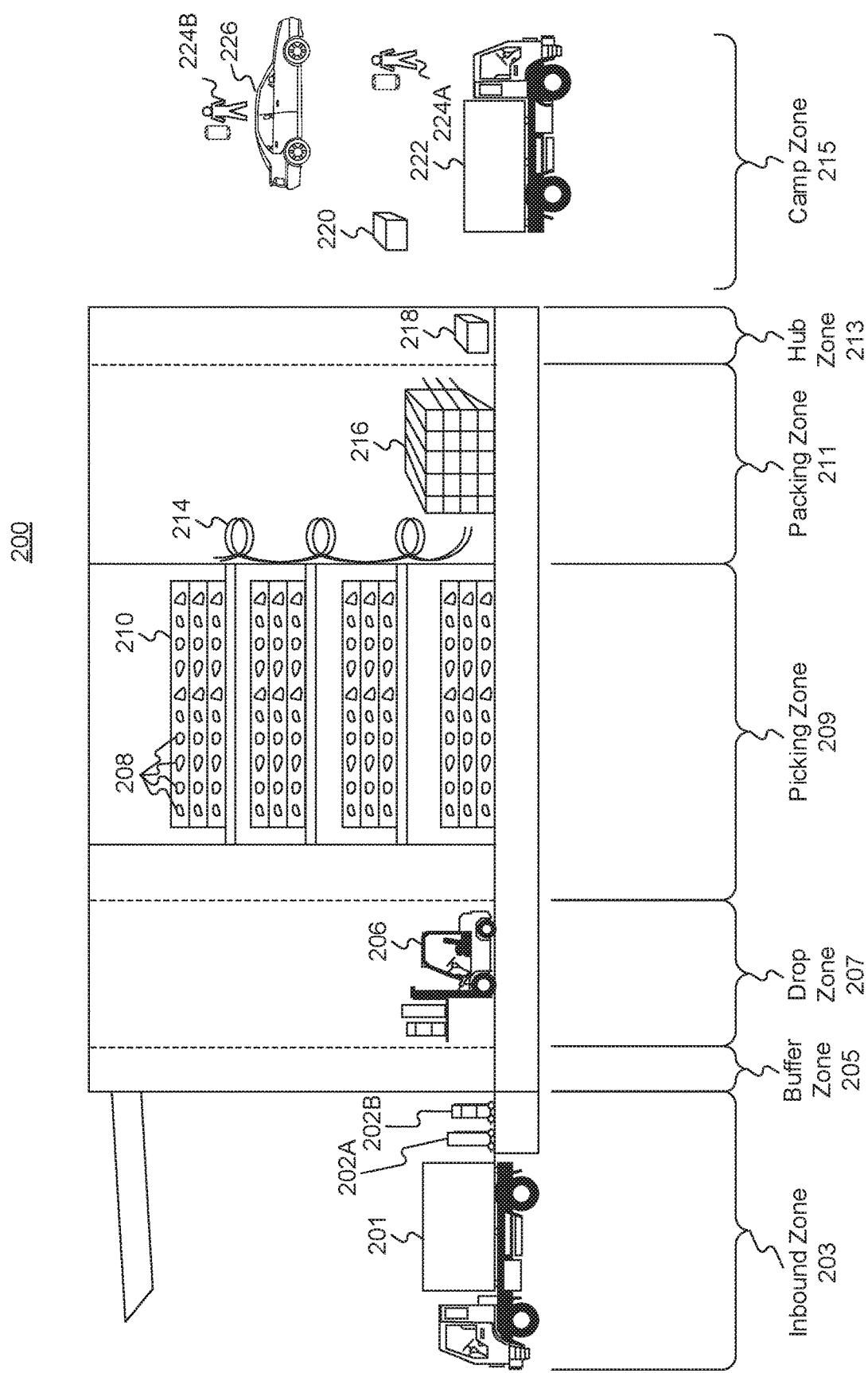

COMPUTERIZED SYSTEMS AND METHODS FOR PROVIDING PRODUCT RECOMMENDATIONS

CROSS-REFERENCE TO RELATED APPLICATIONS

This application claims the benefit of U.S. Provisional Application Ser. No. 62/916,168, filed on Oct. 16, 2019, the disclosure of which is hereby incorporated by reference in its entirety.

TECHNICAL FIELD

The present disclosure generally relates to computerized systems and methods for providing product recommendations. In particular, embodiments of the present disclosure relate to inventive and unconventional systems relate to providing product recommendations by utilizing contextual information associated with products and users.

BACKGROUND

Consumers often shop for and purchase various items online through computers and smart devices. These online shoppers often rely on searching through categories of products to find products to purchase. Therefore, recommending products on e-commerce websites and software applications is important in order to improve customer's shopping experience.

Conventional systems and methods for providing product recommendations on e-commerce websites and software applications exist. However, these conventional systems and methods utilize product models to identify relationships between products. Accordingly, if a user searches for product A, conventional systems will search their database to identify products that are related to product A and recommend the identified products to the user. These product models, however, are static and cannot be adjusted based on contextual information. For example, product models used to provide product recommendations in conventional systems cannot be adjusted to filter the results based on the user's interests, the user's purchase history, product features, or the like. As such, it is difficult to provide personalized product recommendations using conventional systems and methods. Moreover, in order to personalize conventional systems for providing product recommendations, new product models will need to be created for each user based on the user's interests. Creating new product models for each product and each user is time-consuming and utilizes an extremely large amount of storage and processing time.

Static product recommendations may reduce a consumer's user experience by recommending products that the consumer is not interested in, thereby also decreasing profits for the retailer. A consumer's user experience would be significantly improved if the online platform automatically generates product recommendations based on contextual information associated with products and/or users.

Therefore, there is a need for improved methods and systems for providing product recommendations so that the products recommended are personalized and targeted for each user.

SUMMARY

One aspect of the present disclosure is directed to a computer-implemented system for providing product recommendations. The system may comprise at least one processor; and at least one non-transitory storage medium comprising instructions that, when executed by the at least one processor, cause the at least one processor to perform steps. The steps may comprise receiving, from a user device, a search query, defining, using a query handler cluster, context associated with the search query, identifying, using a search cluster, one or more products associated with the defined context, filtering, using the search cluster, the one or more products associated with the defined context based on features associated with the one or more products stored in a database, ranking, using the search cluster, the one or more products associated with the defined context based on a score generated for each product, and displaying, on the user device, product recommendations, wherein the product recommendations comprise a number of the one or more ranked products.

In some embodiments, the context associated with the search query may comprise at least one of product associated with the search query, a timestamp of the search query, a product category associated with the search query, or user information associated with the search query. In some embodiments, the features associated with the one or more products may comprise at least one of related products, related product categories, related product images, feedback score, product category, product price, product review, or product discount. In other embodiments, the features associated with the one or more products may be indexed. In some embodiments, the features associated with the one or more products may be reverse indexed to determine one or more related products associated with each of the one or more products. In other embodiments, the features associated with the one or more products may be reverse indexed to determine one or more filters associated with each of the one or more products.

In some embodiments, the score may be generated for each product using a machine learning model. In some embodiments, the machine learning model may be trained using user feedback information associated with products recommended to users, and wherein the machine learning model is configured to predict performance associated with product recommendations. In yet another embodiment, the at least one processor may be further configured to execute the instructions to log information associated with a user of the user device and generate features associated with the user. The information associated with the user may comprise at least one of products seen by the user, products purchased by the user, products searched by the user, user product preference, user price preference, or user brand preference. In other embodiments, the at least one processor may be further configured to execute the instructions to filter the one or more products associated with the defined context based on the features associated with the one or more products stored in a database and the features associated with the user.

Another aspect of the present disclosure is directed to a method for providing product recommendations. The method may comprise receiving, from a user device, a search query, defining, using a query handler cluster, context associated with the search query, identifying, using a search cluster, one or more products associated with the defined context, filtering, using the search cluster, the one or more products associated with the defined context based on features associated with the one or more products stored in a database, ranking, using the search cluster, the one or more products associated with the defined context based on a score generated for each product, and displaying, on the user device, product recommendations, wherein the product recommendations comprise a number of the one or more ranked products.

In some embodiments, the context associated with the search query may comprise at least one of product associated with the search query, a timestamp of the search query, a product category associated with the search query, or user information associated with the search query. In some embodiments, the features associated with the one or more products may comprise at least one of related products, related product categories, related product images, feedback score, product category, product price, product review, or product discount. In some embodiments, the features associated with the one or more products may be reverse indexed to determine one or more related products associated with each of the one or more products. In other embodiments, the features associated with the one or more products may be reverse indexed to determine one or more filters associated with each of the one or more products.

In some embodiments, the score may be generated for each product using a machine learning model. In some embodiments, the machine learning model may be trained using user feedback information associated with products recommended to users, and wherein the machine learning model is configured to predict performance associated with product recommendations. In yet another embodiment, the method may further comprise logging information associated with a user of the user device and generating features associated with the user. The information associated with the user may comprise at least one of products seen by the user, products purchased by the user, products searched by the user, user product preference, user price preference, or user brand preference. In other embodiments, the method may further comprise filtering the one or more products associated with the defined context based on the features associated with the one or more products stored in a database and the features associated with the user.

Yet another aspect of the present disclosure is directed to a computer-implemented system for detecting inaccuracy in a product title. The system may comprise at least one processor; and at least one non-transitory storage medium comprising instructions that, when executed by the at least one processor, cause the at least one processor to perform steps. The steps may comprise receiving, from a user device, a search query, defining, using a query handler cluster, context associated with the search query, identifying, using a search cluster, one or more products associated with the defined context, filtering, using the search cluster, the one or more products associated with the defined context based on features associated with the one or more products stored in a database and features associated with a user of the user device, ranking, using the search cluster, the one or more products associated with the defined context based on a score generated for each product, and displaying, on the user device, product recommendations, wherein the product recommendations comprise a number of the one or more ranked products. The score may be generated using a machine learning model.

Other systems, methods, and computer-readable media are also discussed herein.

BRIEF DESCRIPTION OF THE DRAWINGS

FIG. 1B depicts a sample Search Result Page (SRP) that includes one or more search results satisfying a search request along with interactive user interface elements, consistent with the disclosed embodiments.

FIG. 1C depicts a sample Single Display Page (SDP) that includes a product and information about the product along with interactive user interface elements, consistent with the disclosed embodiments.

FIG. 2 is a diagrammatic illustration of an exemplary fulfillment center configured to utilize disclosed computerized systems, consistent with the disclosed embodiments.

DETAILED DESCRIPTION

Figure 1A:
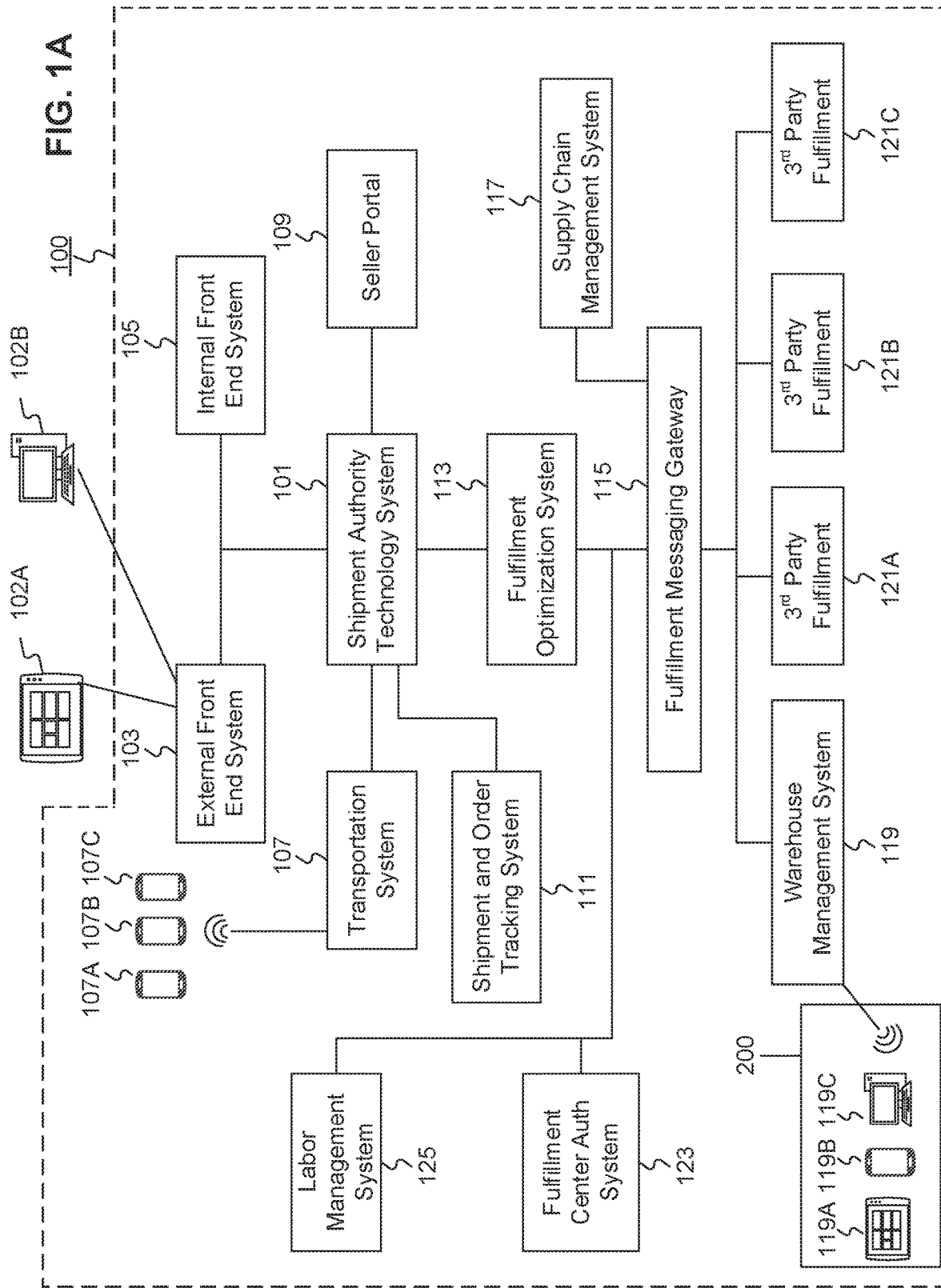
FIG. 1A is a schematic block diagram illustrating an exemplary embodiment of a network comprising computerized systems for communications enabling shipping, transportation, and logistics operations, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for providing product recommendations. The disclosed embodiments are advantageously capable of providing personalized product recommendations by using a machine learning model to rank one or more products based on features associated with users. In addition, the disclosed embodiments are advantageously capable of using contextual information associated with products to provide improved product recommendations.

In one implementation, a pre-processing system may pre-process the initial training data received from training data system to generate synthesized training data. For example, text-based initial training data may be pre-processed using any combination of methods, including stop word elimination, keyword tokenization, deduplication of keywords, and augmentation of the initial training data, and image-based initial training data may be pre-processed using image augmentation techniques (e.g., PyTorch). A hierarchical model trainer system may receive the text-based synthesized training data generated by the pre-processing system and an image model trainer system may receive the image-based synthesized training data generated by the pre-processing system. The hierarchical model trainer system and the image model trainer may generate and train at least one hierarchical model and at least one image model, respectively, using the received synthesized data for product categorization.

In some embodiments, a product category predictor may receive information associated with a first uncategorized product. For example, a seller may be prompted to enter a concatenated text string including the product name, attribute values, manufacturer, brand, and model number when attempting to register a product. The product category predictor may receive a request to predict a number of categories with the highest total probability scores. The product category predictor may use the hierarchical model to predict the most relevant categories of the first uncategorized product by recursively calculating probability scores of potential categories and subcategories. The product category predictor may subsequently sort the uncategorized product into one or more of the categories having the highest total probability scores.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or 3$^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
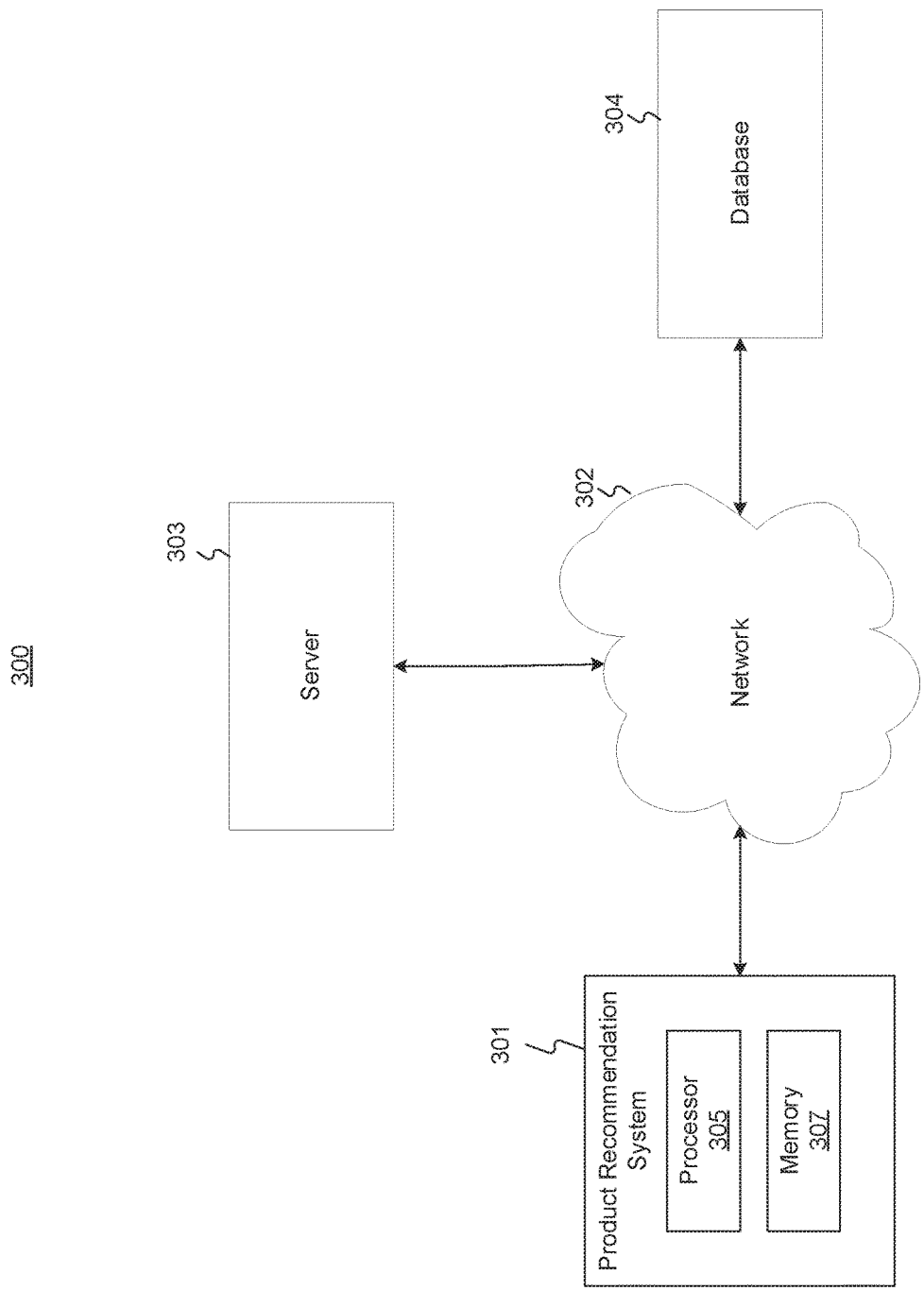
FIG. 3 is a schematic block diagram illustrating an exemplary embodiment of a system comprising computerized systems for providing product recommendations, consistent with the disclosed embodiments.

Referring to FIG. 3, a schematic block diagram illustrating an exemplary embodiment of a system for providing product recommendations is shown. As illustrated in FIG. 3, system 300 may comprise a product recommendation system 301, server 303, and database 304, each of which may communicate with each other via a network 302. In some embodiments, product recommendation system 301 and/or server 303 may communicate with each other and with the other components of system 300 via a direct connection, for example, using a cable. In some other embodiments, system 300 may be a part of system 100 of FIG. 1A and may communicate with the other components of system 100 (e.g., external front end system 103 or internal front end system 105) via network 302 or via a direct connection, for example, using a cable. Product recommendation system 301 and/or server 303 may each comprise a single computer or may each be configured as a distributed computer system including multiple computers that interoperate to perform one or more of the processes and functionalities associated with the disclosed examples.

As shown in FIG. 3, product recommendation system 301 may comprise a processor 305 and memory 307. Processor 305 may be one or more known processing devices, such as a microprocessor from the Pentium™ family manufactured by Intel™ or the Turion™ family manufactured by AMD™. Processor 305 may constitute a single core or multiple core processor that executes parallel processes simultaneously. For example, processor 305 may use logical processors to simultaneously execute and control multiple processes. Processor 305 may implement virtual machine technologies or other known technologies to provide the ability to execute, control, run, manipulate, store, etc. multiple software processes, applications, programs, etc. In another example, processor 305 may include a multiple-core processor arrangement configured to provide parallel processing functionalities to allow product recommendation system 301 and/or server 303 to execute multiple processes simultaneously. One of ordinary skill in the art would understand that other types of processor arrangements could be implemented that provide for the capabilities disclosed herein.

Memory 307 may store one or more operating systems that perform known operating system functions when executed by processor 305. By way of example, the operating system may include Microsoft Windows, Unix, Linux, Android, Mac OS, iOS, or other types of operating systems. Accordingly, examples of the disclosed invention may operate and function with computer systems running any type of operating system. Memory 307 may be a volatile or non-volatile, magnetic, semiconductor, tape, optical, removable, non-removable, or other type of storage device or tangible computer readable medium.

Database 304 may include, for example, Oracle™ databases, Sybase™ databases, or other relational databases or non-relational databases, such as Hadoop™ sequence files, HBase™, or Cassandra™. Database 304 may include computing components (e.g., database management system, database server, etc.) configured to receive and process requests for data stored in memory devices of the database (s) and to provide data from the database(s). Database 304 may include NoSQL databases such as HBase, MongoDB™ or Cassandra™. Alternatively, database 304 may include relational databases such as Oracle, MySQL and Microsoft SQL Server. In some embodiments, database 304 may take the form of servers, general purpose computers, mainframe computers, or any combination of these components.

Database 304 may store data that may be used by processor 305 for performing methods and processes associated with disclosed examples. While FIG. 3 illustrates database 304 external to product recommendation system 301, database 304 may be located in product recommendation system 301. In some embodiments, system 300 may include more than one database 304. Data stored in database 304 may include any suitable data associated with products and/or users that can be used to recommend products. For example, data stored in database 304 may include features associated with products, such as product type names, product type keywords, related or synonymous product type keywords, product name, product image, product brand, product description, product manufacturer name, product category information, search tag(s) associated with the product, product attribute information, etc. In addition, data stored in database 304 may include customer features or features associated with users, such as user name, user log-in information, user purchase history, user interests, user preferences, user activity history, etc. In some embodiments, data stored in database 304 may be used as training data to train, for example, a machine learning model to provide product recommendations. Accordingly, product recommendation system 301 may communicate with database 304 via network 302 to train one or more machine learning models and/or algorithms using training data stored in database 304. Additionally or alternatively, such training data may be stored directly in product recommendation system 301, rather than in an external database, such as database 304.

System 300 may also comprise a server 303. Server 303 may be a web server. Server 303, for example, may include hardware (e.g., one or more computers) and/or software (e.g., one or more applications) that deliver web content that can be accessed by, for example a user through a network (e.g., network 302), such as the Internet. Server 303 may use, for example, a hypertext transfer protocol (HTTP or sHTTP) to communicate with a user. The web pages delivered to the user may include, for example, HTML documents, which may include images, style sheets, and scripts in addition to text content.

A user program such as, for example, a web browser, web crawler, or native mobile application, may initiate communication by making a request for a specific resource using HTTP and server 303 may respond with the content of that resource or an error message if unable to do so. Server 303 also may enable or facilitate receiving content from the user so the user may be able to, for example, submit web forms, including uploading of files. Server 303 may also support server-side scripting using, for example, Active Server Pages (ASP), PHP, or other scripting languages. Accordingly, the behavior of server 303 can be scripted in separate files, while the actual server software remains unchanged.

In other embodiments, server 303 may be an application server, which may include hardware and/or software that is dedicated to the efficient execution of procedures (e.g., programs, routines, scripts) for supporting its applied applications. Server 303 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Server 303 may act as a set of components accessible to, for example, an entity implementing system 100, through an application programming interface (API) defined by the platform itself.

In some embodiments, one or more processors 305 of product recommendation system 305 may use training data stored in database 304 to generate one or more machine learning models to generate product recommendations based on contextual information associated with products and/or customer features. For example, one or more processors 305 may retrieve customer features, such as user's purchase history, user's preferences, user's interests, or the like, via server 303 and stored in database 304 to predict one or more products that the user will likely purchase if recommended.

In some embodiments, one or more processors 305 may access a user's log-in session history, which may include information such as the products that the user has previously clicked-on or searched for. For example, the user's log-in session history may comprise a list of sequential products that the user clicked on during the user's previous log-in session. One or more processors 305 may determine a product type associated with each of the sequential products and identify a sequence of product types. One or more processors 305 may access one or more user's previous log-in sessions to identify sequences of product types that appeared frequently. Based on the identified sequences of product types that appeared frequently in users' log-in session, one or more processors 305 may determine the category and/or type of products to recommend to the user.

In some embodiments, one or more processors 305 may also store, in database 304, the user's feedback information. For example, after providing product recommendations to a user, one or more processors 305 may monitor the user's real-time feedback, such as user's click rates associated with the recommended products, whether the user purchased the recommended products, or the like. By monitoring the user's real-time feedback, one or more processors 305 may determine the actual performance of the product recommendations. Data associated with the user's real-time feedback and actual performance of product recommendations may be stored in database 304 and used by one or more processors 305 to train a machine learning model in order to provide improved and personalized product recommendations.

In other embodiments, one or more processors 305 may use the machine learning model to generate a score for each product to be recommended. The score may be indicative of the strength of the relationship between the product and the user (e.g., how likely the user will purchase the product if recommended). Based on the score generated for each product, one or more processors 305 may automatically rank the products to be recommended. Then, one or more processors 305 may display a number of the ranked products on the user's user device. In other embodiments, the machine learning model may be adjusted based on changes in the user's preferences, user's interests, user's purchase history, user real-time feedback, product availability, product discount, or any other information associated with the products and the user. Accordingly, the machine learning model can be updated in real-time, score generated for each product may be updated in real-time, and the ranking of products to be recommended for a user may be updated in real-time.

System 300 may also comprise a network 302. Network 302 may be one or more of a wireless network, a wired network or any combination of wireless network and wired network. For example, network 302 may include one or more of a fiber optic network, a passive optical network, a cable network, an Internet network, a satellite network, a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11b, 802.15.1, 802.11n and 802.11g or any other wired or wireless network for transmitting and receiving data.

In addition, network 302 may include, but not be limited to, telephone lines, fiber optics, IEEE Ethernet 802.3, a wide area network ("WAN"), a local area network ("LAN"), or a global network such as the Internet. Also network 302 may support an Internet network, a wireless communication network, a cellular network, or the like, or any combination thereof. Network 302 may further include one network, or any number of the exemplary types of networks mentioned above, operating as a stand-alone network or in cooperation with each other. Network 302 may utilize one or more protocols of one or more network elements to which they are communicatively coupled. Network 302 may translate to or from other protocols to one or more protocols of network devices. Although network 302 is depicted as a single network, it should be appreciated that according to one or more embodiments, network 302 may comprise a plurality of interconnected networks, such as, for example, the Internet, a service provider's network, a cable television network, corporate networks, and home networks.

Figure 4:
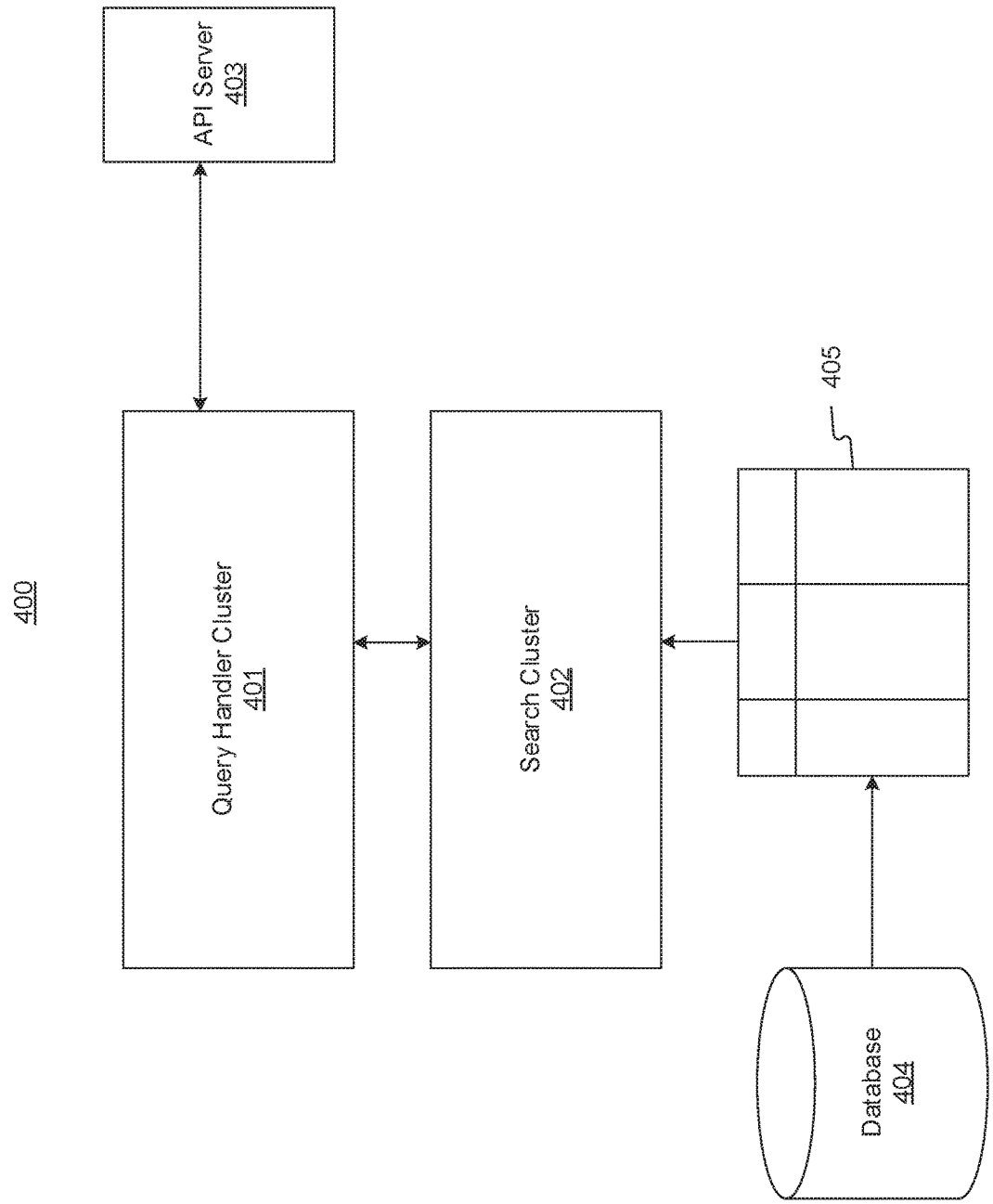
FIG. 4 is a schematic block diagram illustrating components of an exemplary embodiment of a system for providing product recommendations, consistent with the disclosed embodiments.

FIG. 4 is a schematic block diagram illustrating components of an exemplary embodiment of a system 400 for providing product recommendations. System 400 may comprise a query handler cluster 401, a search cluster 402, API server 403, database 404, and a non-relational database 405. One or more components of system 400 may be implemented in production recommendation system 301 of FIG. 3. For example, query handler cluster 401, search cluster 402, and non-relational database 405 may be implemented within production recommendation system 301 of FIG. 3. Additionally or alternatively, database 404 and/or API server 403 may be implemented within production recommendation system 301 of FIG. 3. Additionally or alternatively, database 404 may be implemented as database 304 of FIG. 3, and API server 403 may be implemented as server 303 of FIG. 3.

Database 404 may include, for example, Spark™ databases, machine learning databases, Hive™ databases, TensorFlow datasets, Oracle™ databases, Sybase™ databases, or other relational databases or non-relational databases, such as Hadoop™ sequence files, HBase™, or Cassandra™. Database 404 may include computing components (e.g., database management system, database server, etc.) configured to receive and process requests for data stored in memory devices of the database(s) and to provide data from the database(s). Database 404 may include NoSQL databases such as HBase, MongoDB™ or Cassandra™. Alternatively, database 404 may include relational databases such as Oracle, MySQL and Microsoft SQL Server. In some embodiments, database 404 may take the form of servers, general purpose computers, mainframe computers, or any combination of these components.

Database 404 may store data associated with products that can be used to recommend products. For example, data stored in database 404 may include features associated with products, such as product type names, product type keywords, related or synonymous product type keywords, product name, product image, product brand, product description, product manufacturer name, product category information, search tag(s) associated with the product, product attribute information, product rating (e.g., customer rating associated with the product), etc.

In addition, database 404 may store relational information between products. For example, when a user sends a search query for a product, database 404 may store information associated with products that are related to the product searched by the user. By way of example, database 404 may comprise a look-up table comprising a list of products that are related to the product and that should be recommended to the user based on the search query for the product.

In some embodiments, non-relational database 405 may comprise, for example, Hadoop™ sequence files, HBase™, or Cassandra™. Non-relational database 405 may include computing components (e.g., database management system, database server, etc.) configured to receive and process requests for data stored in memory devices of the database(s) and to provide data from the database(s). Non-relational database 405 may include NoSQL databases such as HBase, MongoDB™ or Cassandra™. In some embodiments, non-relational database 405 may take the form of servers, general purpose computers, mainframe computers, or any combination of these components.

Non-relational database 405 may store features associated with products in an organized format. For example, non-relational database 405 may retrieve the features associated with products from database 404, such as product type names, product type keywords, related or synonymous product type keywords, product name, product image, product brand, product description, product manufacturer name, product category information, search tag(s) associated with the product, product attribute information, product rating (e.g., customer rating associated with the product), related products, related product categories, related product images, user feedback score, product price, product review, or product discount, etc. Afterwards, non-relational database 405 may index and store the features associated with products in columns. For example, each row may represent a product, and each column may represent a feature associated with the product. Accordingly, non-relational database 405 may comprise rows of products and columns of various features associated with each product.

In some embodiments, features associated with products may be reverse indexed to determine one or more filters associated with each product. By reverse indexing the features to determine one or more filters associated with each product, one or more processors 305 may be able to identify other related products that are associated with each product. For example, by reverse indexing, one or more processors 305 may be able to determine product-to-product relations and identify which product searches will return a recommendation for each product.

System 400 may also comprise a query handler cluster 401. Query handler cluster 401 may be configured to define a context associated with a user's search query. For example, when one or more processors 305 of product recommendation system 301 receives a search query from a user, query handler cluster 401 may identify contextual information associated with the search query in order to allow search cluster 402 to identify a list of products that are related to the product associated with the search query. Contextual information may comprise, for example, a product associated with the search query, a timestamp of the search query, a product category associated with the search query, user information associated with the search query, or the like. Query handler cluster 401 may be configured to identify contextual information associated with the search query and define the context to determine one or more products to be recommended to the user. By way of example, if a user searches for a cooking pot, query handler cluster 401 may identify that the product is cooking pot, product category is kitchenware, product price range is about $30-50, etc. Then, query handler cluster 401 may define the context associated with the search query so that search cluster 402 may recommend other kitchenware that can be bought together with a cooking pot and that is generally in the price range of about $30-50.

Additionally or alternatively, query handler cluster 401 may be configured to retrieve customer features from, for example, API server 403. In other embodiments, query handler cluster 401 may be configured to retrieve real-time customer features from database 304 of FIG. 3 or database 404. Customer features may comprise information associated with the user of the search query, including but not limited to, user's search history (e.g., products searched and/or seen by the user), user's purchase history (e.g., products purchased by the user), user's product preference, user's price preference, or user's brand preference. After retrieving customer features, query handler cluster 401 may be configured to filter and improve the defined context associated with the user's search query based on the customer features associated with the user. For example, if the user searching for a cooking pot prefers products with at least 30% off discount, query handler cluster 401 may further define the context associated with the search query based on the user's preference for discounted products. Accordingly, the list of products to be recommended to the user by the search cluster 402 may be further filtered and improved to only include discounted products.

System 400 may also comprise search cluster 402. Search cluster 402 may be configured to retrieve the context defined by the query handler cluster 401 and identify one or more products within the defined context. Search cluster 402 may also retrieve organized product features stored in non-relational database 405. Based on the context defined by query handler cluster 401 and features associated with products in non-relational database 405, search cluster 402 may be configured to identify one or more products within the defined context or associated with the defined context. For example, for the user searching for a cooking pot, search cluster 402 may first search the non-relational database 405 and identify other products associated with the feature "kitchenware" (e.g., in product category), cooking pot (e.g., product name), or the like. After identifying other products, search cluster 402 may filter the list of identified products based on other features associated with the product of the user's search query, such as the brand of the product searched, the price of the product searched, etc. For example, because the product searched by the user was in a price range of $30-50, search cluster 402 may filter the list of identified products to display only the products within the price range of $30-50. Moreover, search cluster 402 may further filter the identified products based on information associated with the user, such as the user's preference for discounted products. Accordingly, search cluster 402 may further narrow down the list of identified products to display only the products that are within the price range of $30-50 and discounted or on sale.

In other embodiments, search cluster 402 may be configured to rank the products within the defined context. In some embodiments, search cluster 402 may be configured to rank the products based on a score generated for each product. As discussed below, a score may be generated for each product using a machine learning model that automatically ranks the identified products in an order in which the products should be recommended to the user. The score may be indicative of the probability that the user is going to click on, view, and/or purchase the product if recommended. Accordingly, the higher the score generated for a product, the more likely the user is to click on, view, and/or purchase the product when recommended. In some embodiments, the machine learning model used to generate the score and rank the products may be trained using user feedback information associated with products recommended to users. For example, one or more processors 305 may monitor a user's real-time feedback information when the user is recommended one or more products. User's real-time feedback information may be monitored by monitoring click rates associated with each product, monitoring sales associated with each product, or the like. Accordingly, when one or more products were recommended to the user, and the user clicked on, viewed, and/or purchased a number of the one or more products recommended, one or more processors 305 may determine an actual performance of the product recommendations based on the user's feedback information. For example, if a trivet, an oven mitt, and a cooking pot were recommended to a user based on a user's search query for a frying pan, and the user clicked on the cooking pot and purchased the cooking pot, one or more processors 305 may determine that the actual performance of the product recommendation for a frying pan was higher than that of the product recommendation for an oven mitt or a trivet. Based on the user's real-time feedback information for product recommendations, one or more processors 305 may train a machine learning model to predict performance associated with product recommendations. Accordingly, based on the performance associated with product recommendations, the machine learning model may be configured to automatically rank the products to be recommended to the user.

System 400 may further comprise API server 403. API server 403 may include hardware and/or software that is dedicated to the efficient execution of procedures (e.g., programs, routines, scripts) for supporting its applied applications. API server 403 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Server 303 may act as a set of components accessible to, for example, an entity implementing system 100, through an API defined by the platform itself. One or more processors 305 may be configured to display product recommendations, via API server 403, on a user interface of a user's device. For example, one or more processors 305 may receive product recommendations identified by query handler cluster 401 and search cluster 402 via API server 403 and display the product recommendations on the user's device.

Figure 5:
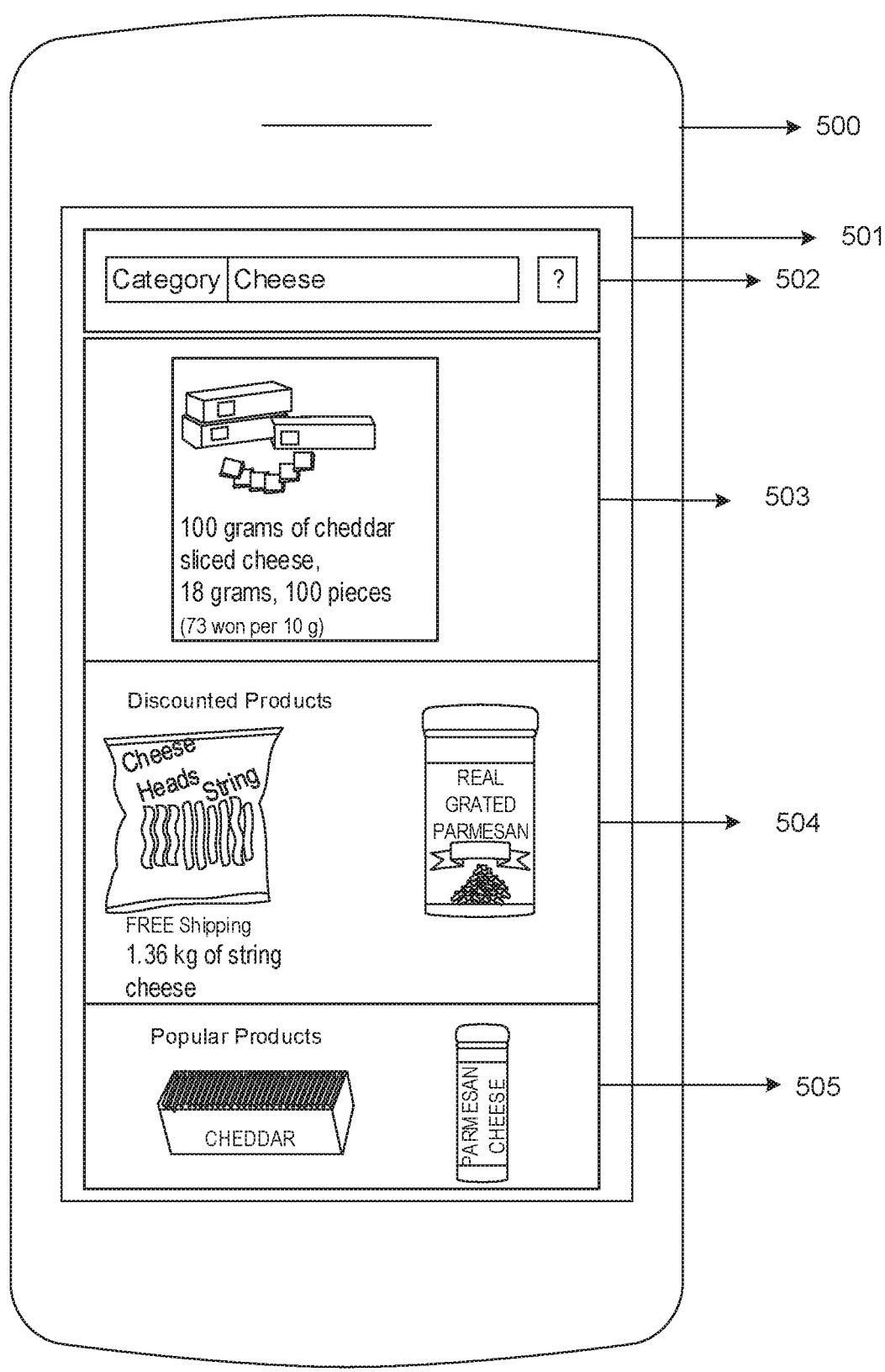
FIG. 5 is a diagram illustrating an exemplary embodiment of a user device with product recommendations displayed, consistent with the disclosed embodiments.

For example, FIG. 5 illustrates an exemplary embodiment of a user device 500 with product recommendations displayed. Referring to the exemplary embodiment shown in FIG. 5, when one or more processors 305 receives a user search query 502 for "Cheese," one or more processors 305 may display the results 503 of the product search. In addition, one or more processors 305 may receive one or more features associated with the search query 502 for "Cheese" from non-relational database 405. As discussed above, using query handler cluster 401, one or more processors 305 may define a context associated with the search query 502 for "Cheese." For example, one or more processors 305 may define that the search query 502 is associated with cheese, that the product category is dairy products. In addition, one or more processors 305 may use search cluster 402 to identify one or more products within the defined context. Accordingly, one or more processors 305 may identify one or more related products within the defined context, such as other types of cheese.

Additionally or alternatively, one or more processors 305 may use search cluster 402 to filter the identified one or more related products based on, for example, user information. By way of example, one or more processors 305 may use query handler cluster 401 to retrieve information associated with the user, such as user preferences for discounted products or popular products. Accordingly, one or more processors 305 may update the context associated with the search query 502 with the retrieved user preferences for discounted products and/or popular products. One or more processors 305 may then use search cluster 402 to filter the identified one or more related products based on user's preferences for discounted products and/or popular products. Additionally or alternatively, one or more processors 305 may use search cluster 402 to rank the filtered products, for example, based on a score generated for each product. Therefore, products may be ranked and displayed from the highest score to the lowest score generated.

After filtering and ranking the products, one or more processors 305 may display the product recommendations on a user interface 501 of user device 500. Because the user associated with search query 502 has a preference for discounted products and popular products, one or more processors 305 may display recommendations for discounted products 504 and recommendations for popular products 505.

Figure 6:
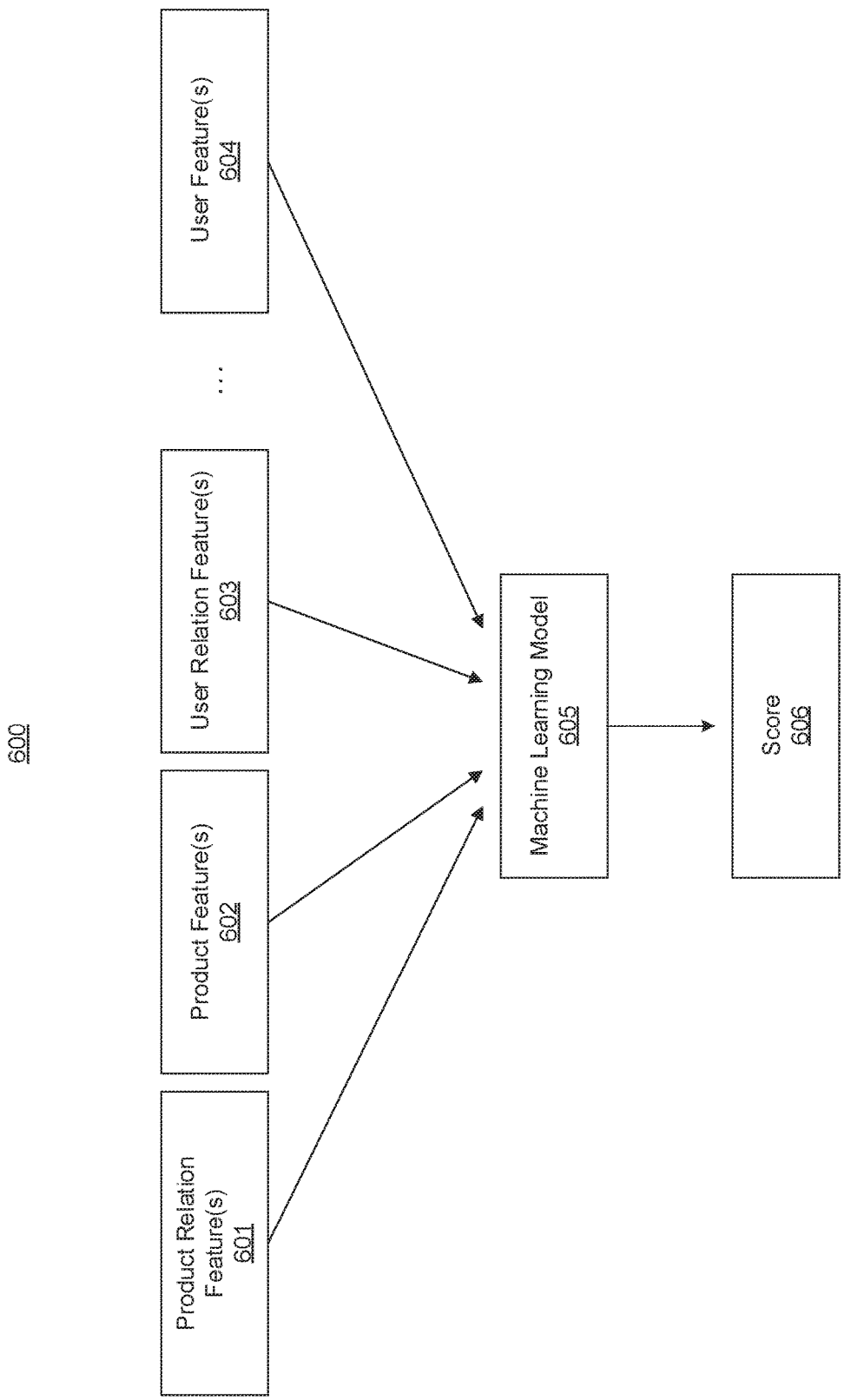
FIG. 6 is a diagram illustrating an exemplary embodiment of a method for using a machine learning model to rank one or more products for recommendation, consistent with the disclosed embodiments.

Referring now to FIG. 6, a diagram illustrating an exemplary embodiment of a method 600 for using a machine learning model 605 to rank one or more products for recommendation is shown. Machine learning model 605 may comprise, for example, deep learning models, classification models, decision trees, or any other machine learning model capable of predicting actual performance of product recommendations. Machine learning model 605 may be trained using data associated with products and/or data associated with users. For example, machine learning model 605 may be trained using product features and/or user features. As discussed above, product features may include product relation features 601 and/or product features 602. Product relation features 601 may comprise, for example, comparison information between a target product associated with a search query and one or more related products. For example, product relation features 601 may include but not limited to price difference between the target product and a related product, category associated with the target product and the related product, image associated with the target product and the related product, etc. Product relation features 601 may also comprise user's feedback information. For example, when a user searches for a product, and a related product is recommended to the user, one or more processors 305 may monitor the user's feedback in real-time to the recommended product (e.g., whether the user clicks on, views, and/or purchases the recommended product) and store the feedback information as a product relation feature 601. Additionally or alternatively, product features 602 may comprise information particularly associated with each product. For example, product features 602 may comprise number of customer reviews for a particular product, customer reviews for the product, customer ratings for the product, real-time user feedback associated with the product, product category, product name, product brand, product price, discounts associated with the product, etc.

Machine learning model 605 may also be trained using data associated with users. For example, user relation features 603 and/or user features 604 may be used to train machine learning model 605. User relation features 603 may comprise relational information between users and products. By way of example, user relation features 603 may comprise user's product preferences, user's preference for discounted products, user's preference for product prices, user's preferred product brands, user's frequently seen or purchased product category, etc. Additionally or alternatively, user features 604 may comprise information particularly associated with each user. For example, user features 604 may comprise user's interests, user's gender, user's age, user's purchase history, user's search history, user's hobbies, or the like. While FIG. 6 illustrates four different types of features 601-604 that can be used to train machine learning model 605, machine learning model 605 may be trained using other types of information.

Machine learning model 605 may be configured to predict actual performance of product recommendations. For example, based on user's real-time feedback information when the user is recommended one or more products, machine learning model 605 may learn to predict a performance of product recommendations, and thus, determine which products should be recommended to the user. Accordingly, machine learning model 605 may be trained to rank products for recommendation to the user based on how likely the user will click on, view, and/or purchase the product when recommended. User's real-time feedback information may be monitored by monitoring click rates associated with each product, monitoring sales associated with each product, or the like. Accordingly, when one or more products were recommended to the user, and the user clicked on, viewed, and/or purchased a number of the one or more products recommended, one or more processors 305 may determine an actual performance of the product recommendations based on the user's feedback information. For example, if a trivet, an oven mitt, and a cooking pot was recommended to a user based on a user's search query for a frying pan, and the user clicked on the cooking pot and purchased the cooking pot, one or more processors 305 may determine that the actual performance of the product recommendation for a frying pan was higher than that of the product recommendation for an oven mitt or a trivet. Based on the user's real-time feedback information for product recommendations, one or more processors 305 may train a machine learning model to predict performance associated with product recommendations. Accordingly, based on the performance associated with product recommendations, the machine learning model may be configured to generate a score 606 to each product to be recommended to the user. For example, the higher the score generated for a product, the more likely the user is to click on, view, and/or purchase the product when recommended. Based on the score generated for each product, one or more processors 305 may use a search cluster, such as search cluster 402, to rank the recommended products in descending order. Accordingly, one or more processors 305 may improve product recommendations by displaying a number of the ranked products for recommendation to the user. By using a machine learning model to rank the products for recommendation based on one or more features 601-604, product recommendations for the user may be more personalized to the user.

Figure 7:
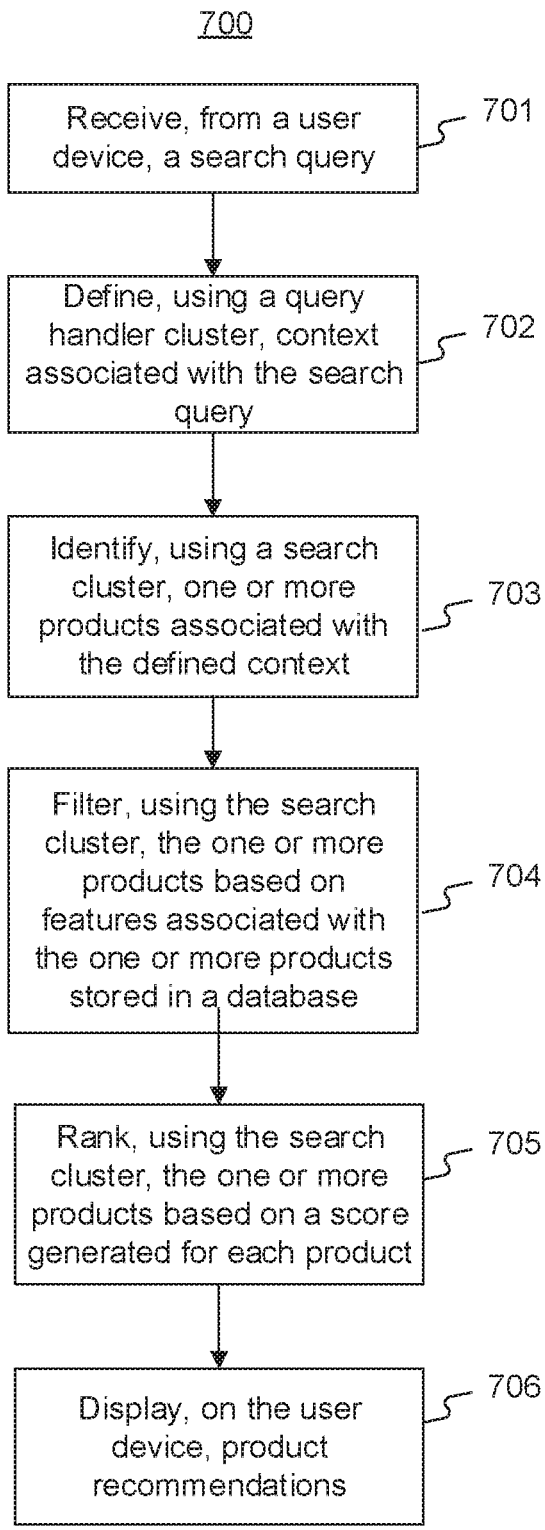
FIG. 7 is a flowchart illustrating an exemplary embodiment of a method for providing product recommendations, consistent with the disclosed embodiments.

FIG. 7 is a flow chart illustrating an exemplary method 700 for providing product recommendations. This exemplary method is provided by way of example. Method 700 shown in FIG. 7 can be executed or otherwise performed by one or more combinations of various systems. Method 700 as described below may be carried out by product recommendation system 301, as shown in FIG. 3, by way of example, and various elements of that system are referenced in explaining the method of FIG. 7. Each block shown in FIG. 7 represents one or more processes, methods, or subroutines in the exemplary method 700. Referring to FIG. 7, exemplary method 700 may begin at block 701.

At block 701, one or more processors 305 may receive, from a user device such as user device 500, a search query such as search query 502 for a particular product. After receiving the search query, method 700 may proceed to block 702. At block 702, one or more processors 305 may define, using query handler cluster 401, context associated with the search query. For example, one or more processors 305 may use query handler cluster 401 to identify contextual information associated with the search query in order to allow a search cluster, such as search cluster 402, to identify a list of products that are related to the product associated with the search query. Contextual information may comprise, for example, a product associated with the search query, a timestamp of the search query, a product category associated with the search query, user information associated with the search query, or the like. One or more processors 305 may use query handler cluster 401 to identify contextual information associated with the search query and define the context to determine one or more products to be recommended to the user. By way of example, if a user searches for a cooking pot, one or more processors 305 may use query handler cluster 401 to identify that the product is cooking pot, product category is kitchenware, product price range is about $30-50, etc. Then, one or more processors 305 may use query handler cluster 401 to define the context associated with the search query so that search cluster 402 may recommend other kitchenware that can be bought together with a cooking pot and that is generally in the price range of about $30-50.

Additionally or alternatively, one or more processors 305 may use query handler cluster 401 to retrieve customer features. Customer features may comprise information associated with the user of the search query, including but not limited to, user's search history (e.g., products searched and/or seen by the user), user's purchase history (e.g., products purchased by the user), user's product preference, user's price preference, or user's brand preference. After retrieving customer features, one or more processors 305 may filter and improve the defined context associated with the user's search query based on the customer features associated with the user. For example, if the user searching for a cooking pot prefers products with at least 30% off discount, one or more processors 305 may further define the context associated with the search query based on the user's preference for discounted products. Accordingly, the list of products to be recommended to the user may be further filtered and improved to only include discounted products.

After defining the context, method 700 may proceed to block 703, at which one or more processors 305 may identify, using search cluster 402, one or more products associated with the defined context. For example, one or more processors 305 may retrieve the defined context and use search cluster 402 to identify one or more products within the defined context. One or more processors 305 may also retrieve organized product features stored in non-relational database 405. Based on the defined context and features associated with products in non-relational database 405, one or more processors 305 may use search cluster 402 to identify one or more products within the defined context or associated with the defined context. For example, for the user searching for a cooking pot, one or more processors 305 may first search the non-relational database 405 and identify other products associated with the feature "kitchenware" (e.g., in product category), cooking pot (e.g., product name), or the like.

After identifying other products, method 700 may proceed to block 704. At block 704, one or more processors 305 may filter, using search cluster 402, the one or more products based on features associated with the one or more products stored in a database, such as database 304 or database 404. In some embodiments, one or more processors 305 may use search cluster 402 to filter the list of identified products based on other features associated with the product of the user's search query, such as the brand of the product searched, the price of the product searched, etc. By way of example, because the product searched by the user was in a price range of $30-50, one or more processors 305 may use search cluster 402 to filter the list of identified products to display only the products within the price range of $30-50. Moreover, one or more processors 305 may use search cluster 402 to further filter the identified products based on information associated with the user, such as the user's preference for discounted products. Accordingly, one or more processors 305 may further narrow down the list of identified products to display only the products that are within the price range of $30-50 and discounted or on sale.

After filtering the products, method 700 may proceed to block 705. At block 705, one or more processors 305 may rank, using search cluster 402, the one or more products based on a score generated for each product. In other embodiments, one or more processors 305 may use search cluster 402 to rank the products within the defined context. As discussed above, a score may be generated for each product using a machine learning model that automatically ranks the identified products in an order in which the products should be recommended to the user. The score may be indicative of the probability that the user is going to click on, view, and/or purchase the product if recommended. Accordingly, the higher the score generated for a product, the more likely the user is to click on, view, and/or purchase the product when recommended. In some embodiments, the machine learning model used to generate the score and rank the products may be trained using user feedback information associated with products recommended to users. For example, one or more processors 305 may monitor a user's real-time feedback information when the user is recommended one or more products. User's real-time feedback information may be monitored by monitoring click rates associated with each product, monitoring sales associated with each product, or the like. Accordingly, when one or more products were recommended to the user, and the user clicked on, viewed, and/or purchased a number of the one or more products recommended, one or more processors 305 may determine an actual performance of the product recommendations based on the user's feedback information. For example, if a trivet, an oven mitt, and a cooking pot was recommended to a user based on a user's search query for a frying pan, and the user clicked on the cooking pot and purchased the cooking pot, one or more processors 305 may determine that the actual performance of the product recommendation for a frying pan was higher than that of the product recommendation for an oven mitt or a trivet. Based on the user's real-time feedback information for product recommendations, one or more processors 305 may train a machine learning model to predict performance associated with product recommendations. Accordingly, based on the performance associated with product recommendations, the machine learning model may be configured to automatically rank the products to be recommended to the user.

After ranking the products, method 700 may proceed to block 706, at which one or more processors 305 may display, on user device 500, product recommendations for the user. For example, one or more processors 305 may display the product recommendations on user interface 501 of user device 500. Product recommendations may be displayed in a particular order based on the score generated for each product. By way of example, products may be ranked in an order from the highest score to the lowest score, and one or more processors 305 may display the products for recommendation in the order from those with the highest score to those with the lowest score.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for providing product recommendations, the system comprising:
 a memory storing instructions; and
 at least one processor configured to execute the instructions to:
  receive, from a user device, a search query for a target product;
  define, using a query handler cluster, context associated with the search query;
  identify, using a search cluster, one or more products associated with the defined context;
  reverse index a first set of features associated with the one or more products to determine one or more filters associated with the one or more products, wherein the one or more filters are based on one or more product-to-product relations determined by reverse indexing the first set of features;
  filter, using the search cluster and the determined one or more filters, the one or more products associated with the defined context based on features associated with the one or more products stored in a database;
  generate a score for each product using a machine learning model trained based on one or more product relation features;
  rank, using the search cluster, the one or more products associated with the defined context in a first order based on the score;
  display, on the user device, product recommendations in the first order, wherein the product recommendations comprise a number of the one or more ranked products;
  monitor, using the search cluster, user feedback information comprising click rates associated with the product recommendations;
  update the machine learning model using the user feedback information; and
  rank, using the search cluster, the one or more products associated with the defined context in a second order based on the updated machine learning model,
  wherein the one or more product relation features are associated with a relationship between the products recommended to the user and the target product.

2. The system of claim 1, wherein the context associated with the search query comprises at least one of a product associated with the search query, a timestamp of the search query, a product category associated with the search query, or user information associated with the search query.

3. The system of claim 1, wherein the features associated with the one or more products comprise at least one of related products, related product categories, related product images, feedback score, product category, product price, product review, or product discount.

4. The system of claim 1, wherein the features associated with the one or more products are indexed.

5. The system of claim 4, wherein the features associated with the one or more products are reverse indexed to determine one or more related products associated with each of the one or more products.

6. The system of claim 1, wherein the machine learning model is configured to predict performance associated with product recommendations.

7. The system of claim 1, wherein the at least one processor is further configured to execute the instructions to:
    log information associated with a user of the user device, wherein the information comprises at least one of products seen by the user, products purchased by the user, products searched by the user, user product preference, user price preference, or user brand preference; and
    generate features associated with the user.

8. The system of claim 7, wherein the at least one processor is further configured to execute the instructions to:
    filter the one or more products associated with the defined context based on the features associated with the one or more products stored in a database and the features associated with the user.

9. A computer-implemented method for providing product recommendations, the method comprising:
    receiving, from a user device, a search query for a target product;
    defining, using a query handler cluster, context associated with the search query;
    identifying, using a search cluster and the determined one or more filters, one or more products associated with the defined context;
    reverse indexing a first set of features associated with the one or more products to determine one or more filters associated with the one or more products, wherein the one or more filters are based on one or more product-to-product relations determined by reverse indexing the first set of features;
    filtering, using the search cluster and the determined one or more filters, the one or more products associated with the defined context based on features associated with the one or more products stored in a database;
    generating a score for each product using a machine learning model trained based on one or more product relation features;
    ranking, using the search cluster, the one or more products associated with the defined context in a first order based on the score;
    displaying, on the user device, product recommendations in the first order, wherein the product recommendations comprise a number of the one or more ranked products;
    monitoring, using the search cluster, user feedback information comprising click rates associated with the product recommendations;
    updating the machine learning model using the user feedback information;
    ranking, using the search cluster, the one or more products associated with the defined context in a second order based on the updated machine learning model; and
    displaying, on the user device, the product recommendations in the second order, wherein the product recommendations comprise a number of the one or more ranked products,
    wherein the one or more product relation features are associated with a relationship between the products recommended to the user and the target product.

10. The method of claim 9, wherein the context associated with the search query comprises at least one of a product associated with the search query, a timestamp of the search query, a product category associated with the search query, or user information associated with the search query.

11. The method of claim 9, wherein the features associated with the one or more products comprise at least one of related products, related product categories, related product images, feedback score, product category, product price, product review, or product discount.

12. The method of claim 9, wherein the features associated with the one or more products are reverse indexed to determine one or more related products associated with each of the one or more products.

13. The method of claim 9, wherein the machine learning model is configured to predict performance associated with product recommendations.

14. The method of claim 9, further comprising:
    logging information associated with a user of the user device, wherein the information comprises at least one of products seen by the user, products purchased by the user, products searched by the user, user product preference, user price preference, or user brand preference; and
    generating features associated with the user.

15. The method of claim 14, further comprising:
    filtering the one or more products associated with the defined context based on the features associated with the one or more products stored in a database and the features associated with the user.

16. A computer-implemented system for providing product recommendations, the system comprising:
    a memory storing instructions; and
    at least one processor configured to execute the instructions to:
        receive, from a user device, a search query for a target product;
        define, using a query handler cluster, context associated with the search query;
        identify, using a search cluster, one or more products associated with the defined context;
        reverse index a first set of features associated with the one or more products to determine one or more filters associated with the one or more products, wherein the one or more filters are based on one or more product-to-product relations determined by reverse indexing the first set of features;
        filter, using the search cluster and the determined one or more filters, the one or more products associated with the defined context based on features associated with the one or more products stored in a database and features associated with a user of the user device;
        generate a score for each product using a machine learning model trained based on one or more product relation features;
        rank, using the search cluster, the one or more products associated with the defined context in a first order based on a score generated for each product, wherein the score;

display, on the user device, product recommendations in the first order, wherein the product recommendations comprise a number of the one or more ranked products;

monitor, using the search cluster, user feedback information comprising click rates associated with the product recommendations;

update the machine learning model using the user feedback information;

rank, using the search cluster, the one or more products associated with the defined context in a second order based on the updated machine learning model; and display, on the user device, the product recommendations in the second order, wherein the product recommendations comprise a number of the one or more ranked products, wherein the one or more product relation features are associated with a relationship between the products recommended to the user and the target product.

* * * * *

UNITED STATES PATENT AND TRADEMARK OFFICE
CERTIFICATE OF CORRECTION

PATENT NO. : 11,354,721 B2  
APPLICATION NO. : 17/014551  
DATED : June 7, 2022  
INVENTOR(S) : Rui Jiang et al.

Page 1 of 1

It is certified that error appears in the above-identified patent and that said Letters Patent is hereby corrected as shown below:

In the Claims

Claim 16, Column 28, Lines 66-67, "product, wherein the score;" should read as --product,--.

Signed and Sealed this
Second Day of August, 2022

Katherine Kelly Vidal
*Director of the United States Patent and Trademark Office*